(12) United States Patent
Palma Lizana et al.

(10) Patent No.: US 10,147,092 B2
(45) Date of Patent: Dec. 4, 2018

(54) SYSTEM AND METHOD FOR SIGNING AND AUTHENTICATING SECURE TRANSACTIONS THROUGH A COMMUNICATIONS NETWORK

(76) Inventors: Mauricio Eduardo Palma Lizana, Santiago (CL); Mauricio Alejandro Gaucca Figueroa, Santiago (CL)

(*) Notice: Subject to any disclaimer, the term of this patent is extended or adjusted under 35 U.S.C. 154(b) by 1025 days.

(21) Appl. No.: 14/390,497

(22) PCT Filed: Apr. 3, 2012

(86) PCT No.: PCT/IB2012/051625
§ 371 (c)(1),
(2), (4) Date: Oct. 3, 2014

(87) PCT Pub. No.: WO2013/150333
PCT Pub. Date: Oct. 10, 2013

(65) Prior Publication Data
US 2015/0170144 A1    Jun. 18, 2015

(51) Int. Cl.
*G06Q 20/00* (2012.01)
*G06Q 20/40* (2012.01)
(Continued)

(52) U.S. Cl.
CPC ....... *G06Q 20/401* (2013.01); *G06Q 20/3227* (2013.01); *G06Q 20/3276* (2013.01);
(Continued)

(58) Field of Classification Search
CPC .................................................. G06Q 20/401
(Continued)

(56) References Cited

U.S. PATENT DOCUMENTS

| 2005/0010758 A1* | 1/2005 | Landrock | G06F 21/645 |
| | | | 713/156 |
| 2010/0070759 A1* | 3/2010 | Leon Cobos | G06F 21/43 |
| | | | 713/155 |

* cited by examiner

*Primary Examiner* — Ashokkumar B Patel
*Assistant Examiner* — Syed M Ahsan
(74) *Attorney, Agent, or Firm* — Hamre, Schumann, Mueller & Larson, P.C.

(57) ABSTRACT

A system to sign and authenticate secure transactions with an institution through a communications network, comprising a terminal connected to a communications network; a remote server with a database that stores for each user the user data userID, a private password encrypted $K'_{priv,\ userID}$, a first security password $K'_{mac,\ userID}$ to generate an authentication password $K_{mac,\ userID}$ and an identifier of the mobile device, $Id'_{cel,userID}$; a mobile communication device of a user comprising a security code pin; an application, a transport password $K_{transporte}$; a public password encrypted $K''_{pub,\ userID}$ and a second security password $K''_{mac,\ userID}$ for generating said authentication password $K_{mac,\ userID}$; and a remote hardware security module. A method to sign and authenticate secure transactions with an institution through a communications network with said system.

5 Claims, 3 Drawing Sheets

(51) Int. Cl.
*H04L 9/08* (2006.01)
*H04L 9/32* (2006.01)
*G06Q 20/32* (2012.01)
*G06Q 20/38* (2012.01)

(52) U.S. Cl.
CPC ..... *G06Q 20/3821* (2013.01); *G06Q 20/3823* (2013.01); *G06Q 20/4012* (2013.01); *G06Q 20/40975* (2013.01); *H04L 9/0861* (2013.01); *H04L 9/3226* (2013.01); *H04L 9/3247* (2013.01)

(58) Field of Classification Search
USPC ........................................................ 713/150
See application file for complete search history.

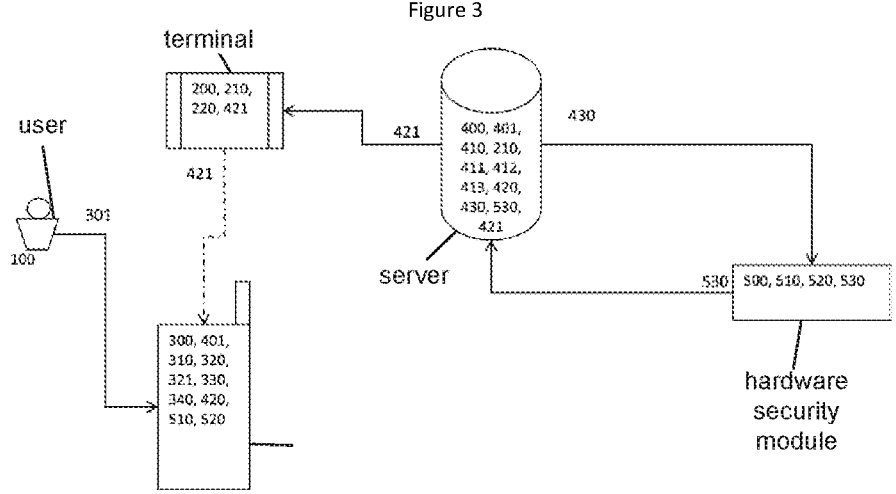
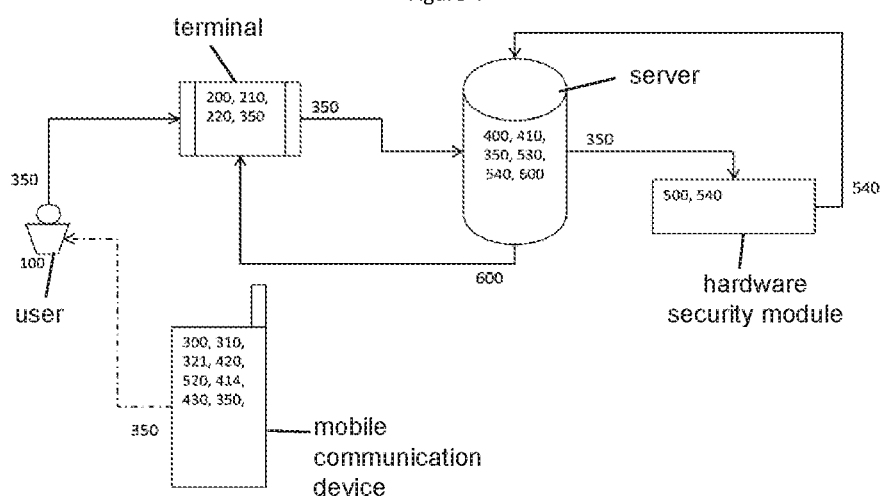

SYSTEM AND METHOD FOR SIGNING AND AUTHENTICATING SECURE TRANSACTIONS THROUGH A COMMUNICATIONS NETWORK

TECHNICAL FIELD

The present invention relates to the security industry in electronic transactions, in particular to a system and method to sign and authenticate secure Internet transactions.

BACKGROUND

At present different solutions to ensure the identity of persons when performing electronic transactions, such as to access to consult or to manage a bank account through the network are known.

For example, U.S. Patent Application No. US2006/0053281 describes an existing communication device, such as a WAP-enabled mobile phone, or other device, that can be used as authentication token. This document describes the use of a mobile device as authentication device based on its wireless public password infrastructure (WPKI) already present in the device; then the device can generate independent session passwords used to encrypt the messages to be transmitted and to decode the messages received. However, the mobile device can be tricked to generate independent session passwords by request of false authentication.

Another solution is illustrated in U.S. Patent Application No. US 2008/0307515, which describes a method for authenticating a user. The method comprises the step of sending a request for authentication to a remote authentication device and generating a first piece of authentication information. A mobile device receives the first piece of authentication information from an access terminal or a remote authentication device. The user's mobile device generates a second piece of authentication information which is at least partially based on the first piece of authentication information. The second piece of authentication information is sent to the remote authentication device and the second piece of authentication information is validated. It is noted that the method comprises sending a first piece of authentication information to a mobile device, such as a visual code; however, it does not identify or detail how this first piece of authentication information may be considered genuine, this being why vulnerability is observed in the method disclosed. Although it is mentioned that better security can be implemented between the remote device and the mobile device authentication using asymmetric cryptography where a cryptographic public password would be stored in the remote authentication device and a private password would be stored in the mobile device. It is not indicated how such asymmetric encryption would be done, and how a private password could be securely transmitted to be stored in a mobile device and thus ensuring the authenticity of the first piece of information sent.

It is noted that a vulnerability exists in the prior art methods to ensure that the information transmitted between a mobile device and a server is genuine to validate a connection terminal.

BRIEF SUMMARY

A system and method are presented for signing and authenticating transactions where the information transmitted is signed in all transmissions by communication networks both between mobile device and server and between terminals and servers. All the information transmitted between devices via communications networks is signed through temporary passwords, symmetric passwords and asymmetric passwords, and using a safety device also known as Hardware Security Module (HSM). Public, private and user authentication passwords are kept encrypted with said HSM.

The present invention allows keeping the signed data in all transmissions of information. Additionally, signing, security or authentication passwords are stored and encrypted with user-specific parameters so as to prevent spoofing and ensure the authenticity of the user when performing transactions.

Additionally, the present invention comprises methods for the activation of a user with secure deployment of its private, public, security and authentication passwords. The system of the present invention stores in the mobile communication device, information such as a public password encryption configured through the activation process for a particular user that allows using this information to safely reactivate an account that has been blocked from said mobile communication device.

BRIEF DESCRIPTION OF THE FIGURES

FIG. 3 schematically illustrates the system and additional steps of the method of the present invention, according to an exemplary embodiment.

FIG. 4 schematically illustrates the system and the additional steps of the method of the present invention, according to an exemplary embodiment.

DETAILED DESCRIPTION

Figure 1:
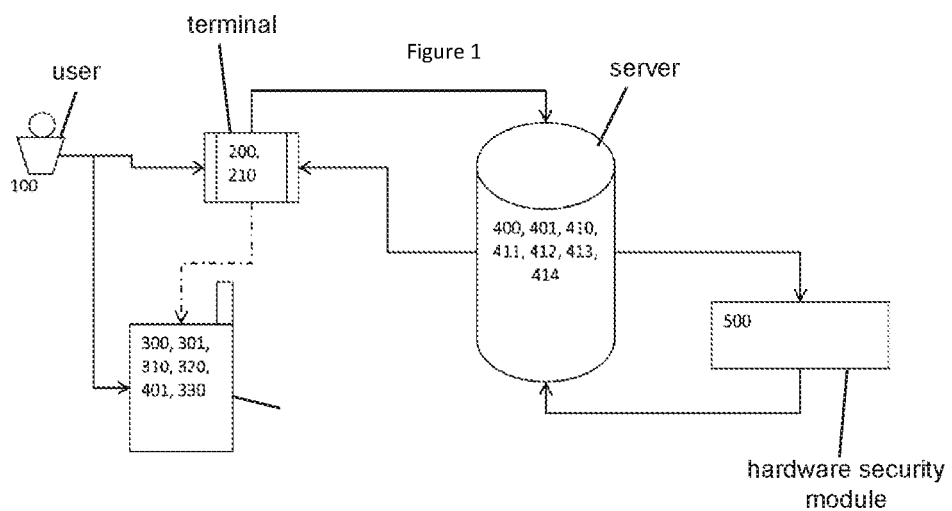
FIG. 1 schematically illustrates the system components of the present invention, according to an exemplary embodiment.

As illustrated in FIG. 1, the present invention is a system for secure transaction signing and authentication through a communication network (Internet) comprising:

A terminal (200) connected to a communications network;

A remote server (400) to a database (410) storing for each user (100) the user ID user data (210), a private password encrypted $K'_{priv,\ userID}$ (411), a first security password $K'_{mac,\ userID}$ (412) for generating an authentication password $K_{mac,\ userID}$ (520) and an identifier of the mobile device $Id'_{cel,\ userID}$ (414);

A mobile communication device (300) of a user (100) comprising a security code, also known as pin (301); an application (310), a transport password $K_{transporte}$ (401) for decoding the information of activation; a public password encrypted $K''_{pub,\ userID}$ (320) and a second security password $K''_{mac,\ userID}$ (330) to generate the authentication password $K_{mac,\ userID}$ (520); and A remote hardware security module (500) also known as HSM, for its acronym in English: "Hardware Security Module".

The present invention further provides a method for secure transaction signing and authentication through a communication network (Internet) where a user (100) and its mobile communication device (300) have been previously activated.

Figure 2:
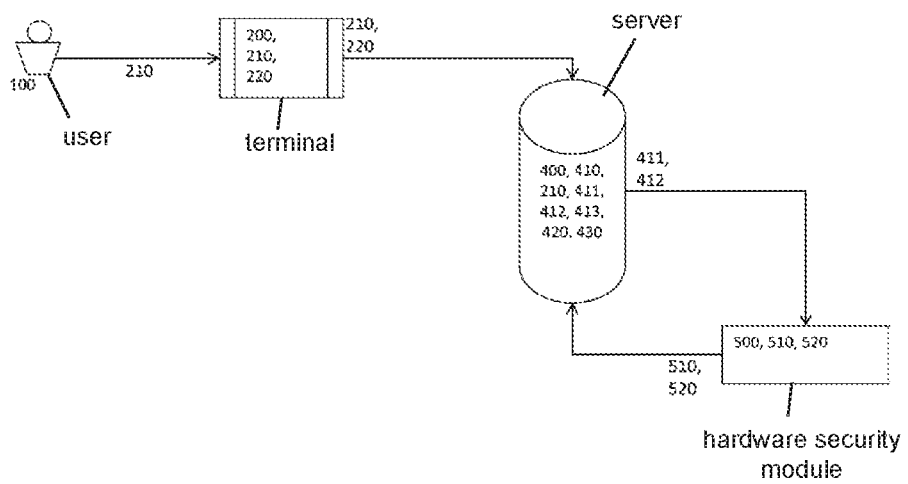
FIG. 2 schematically illustrates the system and the steps of the method of the present invention, according to an exemplary embodiment.

As illustrated in FIG. 2, the method to sign and authenticate secure transactions over a communications network (such as Internet) where a user (100) and its mobile communication device (300) have been previously activated, comprising the steps of:

a) Enter by a user (100) its user data (220) in the site of an institution from a terminal (200) connected to a communications network, b) Send from the terminal (200) through said communication network, the user data UserID (220), a request (210) and a request for signing the petition (210) to a remote server (400), where said remote server (400) comprises: a database (410) storing for each user (100) its user userID (210), a private encrypted password $K'_{priv, userID}$ (411), a first security password $K'_{mac, userID}$ (412) for generating an authentication password $K_{mac, userID}$ (520) and an identifier of the mobile device $Id'_{cel, userID}$ (414);

c) Check in the database (410) of the remote server (400) that for the user data userID (220), said user (100) is authorized; in case the user is not authorized, then the request (210) is rejected; if it is authorized proceed to the next step;

d) Send from the remote server (400), the private encrypted password $K'_{priv, userID}$ (411) and the first security password $K'_{mac, userID}$ (412) of said user (100) to a remote hardware security module (500) to be decrypted;

e) Return from the remote hardware security module (500) to the remote server (400) the private password $K_{priv, userID}$ (510) and the authentication password $K_{mac, userID}$ (520) of said user;

f) Generate in the remote server (400) a set of signed data $D_S$ (420) using the private password of the user $K_{priv, userID}$ (510), WHEREIN said dataset signed $D_S$ (420) comprises at least the user data userID (220), the date and time of the request (210), the signature by the private password $K_{priv, userID}$ (510), and the data in the request (210);

g) Generate in the remote server (400) a confirmation code $Cod_{userID, Ds}$ (430) by a message authentication code (known as MAC by its acronym for "Message Authentification Code") and from the authentication password $K_{mac, userID}$ (520), the set of data signed $D_S$ (420), the identifier of the mobile device $Id'_{cel, userID}$ (414).

Below, the next steps of the method of the present invention are described with reference to FIG. 3:

h) Send the confirmation code $Cod_{userID, Ds}$ (430) from the remote server (400) to remote hardware security module (500);

i) Encrypt said confirmation code $Cod_{userID, Ds}$ (430) by remote hardware security module (500) as a confirmation code encrypted $Cod'_{userID, Ds}$ (530), return the confirmation code encrypted $Cod'_{userID, Ds}$ (530) to the remote server (400) and store it in the database (410) together with the date and time of creation, and generate a number of validation attempts to zero;

j) Generate in the remote server (400) a two-dimensional bar code QR (421) from the signed data set $D_s$ (420);

k) Send to the terminal (200) the two-dimensional bar code (421) and display the two-dimensional bar code (421) at the institution's site;

l) Starting by said user (100) an application (310) in a mobile communication device (300), WHEREIN said mobile communication device (300) comprises said application (310), a security code also known as pin (301), a transport password $K_{transporte}$ (401) for decoding activation information, a public password encrypted $K''_{pub, userID}$ (320), and a second security password $K''_{mac, userID}$ (330) to generate the authentication password $K_{mac, userID}$ (520);

m) Enter by the user (100) the security code or pin (301) in that application (310) of the mobile communication device (300);

n) Derive a temporary password $K_{temp, pin}$ (340) created on the basis of the security code or pin (301) entered by the user (100) and according to a password derivation algorithm such as PBKDF2 or PKCS5 protocol;

o) Decrypt by the application (310) of the mobile communication device (300), the public password encrypted $K''_{pub, userID}$ (310) with the temporary password $K_{temp, pin}$ (340) and the second security password $K''_{mac, userID}$ (320) to obtain the public password $K_{pub, userID}$ (321) and the authentication password $K_{mac, userID}$ (520);

p) Capture and decode the two-dimensional bar code (421) of the institution's website by the application (310) of the mobile communication device (300);

q) Validate the private password signature $K_{priv, userID}$ (510) of the set of signed data $D_S$ (420) with the public password $K_{pub, userID}$ (321); if validation is false, then the request (210) is rejected; if validation is true, it is proceed with the present invention method.

Below, the next steps of the method of the present invention are described with reference to FIG. 4:

r) Generate by the application (310) of the mobile communication device (300), the identifier of the mobile device $Id'_{cel, userID}$ (414) with at least the serial number of the mobile device and the authentication password $K_{mac, userID}$ (520) and the message authentication code MAC;

s) Generate the mobile confirmation code $Cod_{userID, Ds, Mobile}$ (350) by said message authentication code MAC and from the authentication password $K_{mac, userID}$ (520), the signed dataset $D_s$ (420), the identifier of the mobile device, $Id'_{cel, userID}$ (414);

t) Display the mobile confirmation code $Cod_{userID, Ds, mobile}$ (350) in the application (310) of the mobile communication device (300) along with the request data (210); if the data of the request (210) are incorrect, the user can cancel the operation; if they are right continues to the next step;

u) Enter the confirmation mobile code $Cod_{userID, Ds, mobile}$ (350) in the terminal institution's website (200);

v) Send from the terminal (200) to the remote server (400) said mobile confirmation code $Cod_{userID, Ds, Mobile}$ (350);

w) Encrypt said mobile confirmation code $Cod_{userID, Ds, mobile}$ (350) by the remote hardware security module (500) as a mobile confirmation code encrypted $Cod'_{userID, Ds, mobile}$ (540);

x) Compare said mobile confirmation code encrypted $Cod'_{userID, Ds, mobile}$ (540) with the confirmation code encrypted $Cod'_{userID, Ds}$ (530) received in step i); if the two codes do not match, reject the request (210);

y) If both confirmation codes match and the number of validation attempts does not exceed a predefined maximum within a predefined period of time, send a success code (600) to the terminal (200) to authorize the request (210).

In particular, said private password $K_{priv,\ userID}$ (510) and said public password $K_{pub\ userID}$ (321) are corresponding asymmetric passwords and deliver a true validation, WHEREIN the authentication password $K_{mac,\ userID}$ (520) is a symmetric password.

According to a preferred aspect of the invention, said two dimensional bar code (421) is a two-dimensional code generated by one of the following codes: Quick Response Code (QRC for its acronym in English), pdf417, data matrix "Datamatrix", "MaxiCode" and circular bar code "Shot-Code".

According to a preferred aspect of the invention, where said user (100) is authorized, that means that the user (100) is in an active account and is not blacklisted.

According to a preferred aspect of the invention, steps d), e), f) and g) are performed on the remote hardware security module (500) with its processor and internal memory, i.e. the private password encrypted $K'_{priv,\ userID}$ (411) and the first security password $K'_{mac,\ userID}$ (412) of said user (100) are stored on said remote hardware security module (500).

According to a preferred aspect of the invention, step x) is also performed by the remote hardware security module (500) with its processor and internal memory, i.e. comparing said mobile confirmation code encrypted $Cod'_{userID,\ Ds,\ Mobile}$ (540) with the confirmation code encrypted $Cod'_{userID,\ Ds}$ (530) is performed by said remote hardware security module (500) with its processor and memory.

According to a preferred aspect of the invention, the public password encrypted $K'_{pub,\ userID}$ (320) is generated by the application (310) by the encryption of the public password $K_{pub,\ userID}$ (321) and a temporary password $K_{temp,\ pin}$ (340), created on the basis of temporary security code or pin (301) entered by the user (100) and according to a password derivation algorithm, such as the protocol PBKDF2 or PKCS5 and said public password $K_{pub,\ userID}$ (321) corresponds to a private password $K_{priv,\ userID}$ (510).

According to a preferred aspect of the invention, the second security password $K''_{mac,\ userID}$ (330) is generated by the application (310) by encrypting the authentication password $K_{mac,\ userID}$ (520) and said temporary password $K_{temp,\ pin}$ (340).

According to a preferred aspect of the invention, the private password encrypted $K'_{priv,\ userID}$ (411) is generated by the remote hardware security module (500) by encrypting said private password $K_{priv,\ userID}$ (510).

According to a preferred aspect of the invention, the first security password $K'_{mac,\ userID}$ (412) is generated by the remote hardware security module (500) by encrypting said authentication password $K_{mac,\ userID}$ (520).

According to a preferred aspect of the invention, the mobile device identifier $Id'_{cel,\ userID}$ (414) is generated by the application (310) in said mobile communication device (300) with at least the serial number of the device mobile communication (300) and the authentication password $K_{mac,\ userID}$ (520) and a message authentication code MAC.

According to a preferred aspect of the invention, said message authentication code is a Hash type code (HMAC).

According to a preferred aspect of the invention, the user data UserID (220) comprises one or more of the following: user name, user address, email address, number of the identity card, user's social security number, internet user's password for the institution, at least four digits of an institution's card user, a dynamic password, a predefined password.

Figure 5:
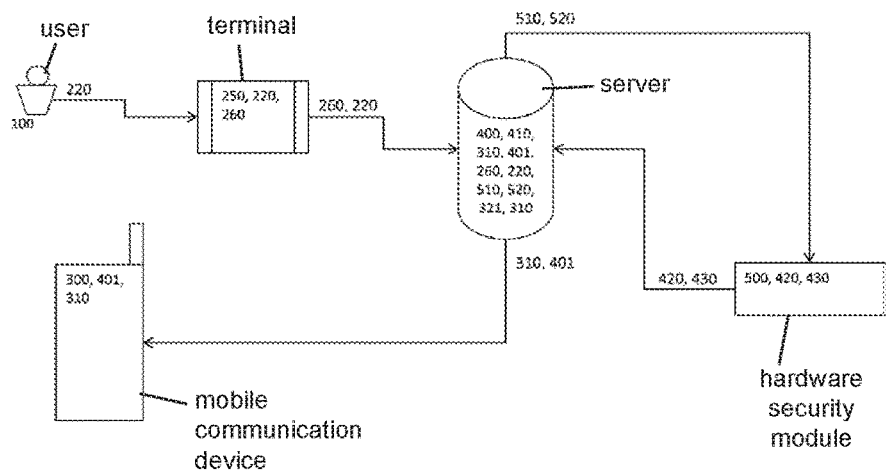
FIG. 5 schematically illustrates the system and the activating steps for the user in the method of the present invention, according to an exemplary embodiment.

According to another aspect of the present invention and as illustrated in FIG. 5, prior to step a) the activation of the mobile communication device (300) of the user (100) is performed by the following steps:

a) Access the site of the institution through a terminal (250) through a communications network and enter your user data UserID (220);

b) Download from the remote server (400) in its mobile communication device (310), the application (310) and the transport password $K_{transporte}$ (401);

c) Send from the terminal (250) to the remote server (400) the user data UserID (220) and an activation request (260)

d) Check in the database (410) the remote server (400) that for the user data UserID (220), said user (100) is authorized; in case the user is not authorized, then the activation request (260) is rejected; if it is authorized, proceed with the next step;

e) Generate on the remote server (400) the public password $K_{pub,\ userID}$ (321), the private password $K_{priv,\ userID}$ (510) and the authentication password $K_{mac,\ userID}$ (520) that are exclusive for said user data UserID (220) in a temporary memory of said remote server (400);

f) Send from the remote server (400), the private password $K_{priv,\ userID}$ (510) and the authentication password $K_{mac,\ userID}$ (520) of the user (100) to a remote hardware security module (500) and remove from the temporary memory of the remote server (400) the private password $K_{priv,\ userID}$ (510);

g) Encrypt in the remote hardware security module (500), the private password $K_{priv,\ userID}$ (510) and the encryption password $K_{mac,\ userID}$ (520) as a private encryption password $K'_{priv,\ userID}$ (411) and a first security password $K'_{mac,\ userID}$ (412) for the user (100);

h) Return from the remote hardware security module (500) to the remote server (400) and store in the database (410), the private password encrypted $K'_{priv,\ userID}$ (411) and the first security password $K'_{mac,\ userID}$ (412) of the user (100).

Figure 6:
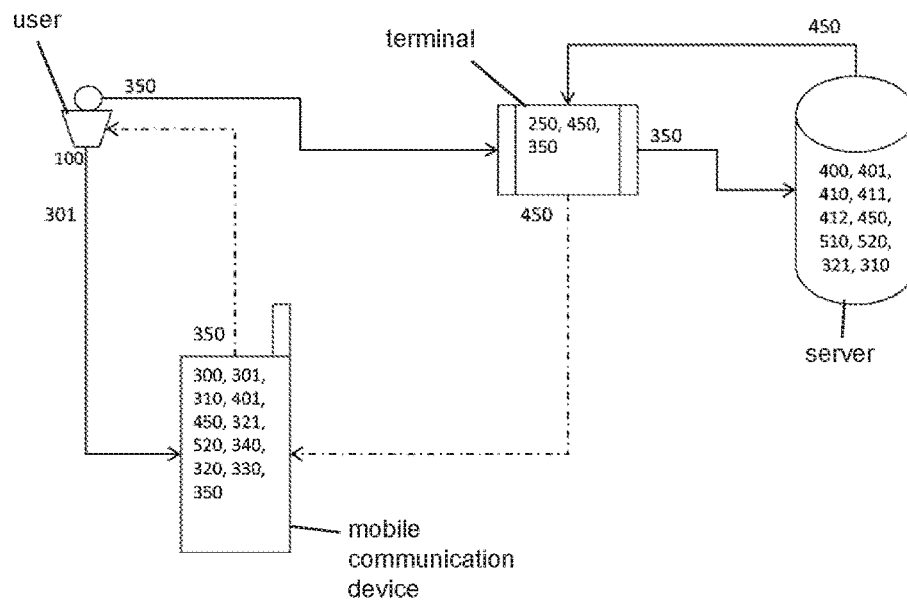
FIG. 6 schematically illustrates the system and additional steps for user activation method of the present invention, according to an exemplary embodiment.

Below the next activation steps of the mobile communication device (300) of user (100) in the method of the present invention are described in reference to FIG. 6:

i) Encrypt on the remote server (400) the public password $K_{pub,\ userID}$ (321) and the authentication password $K_{mac,\ userID}$ (520) by the transport password $K_{transporte}$ (401) and from them generate two-dimensional bar code activation (450);

j) Capture and decode the two-dimensional bar code activation (450) of the institution's website by the application (310) of the mobile communication device (300);

k) Enter the pin security code (301) by the user (100) in the application (310) of the mobile communication device (300);

l) Decrypt the information of the dimensional bar code activation (450) by the password transport $K_{transporte}$ (401) and the application (310) of the mobile communication device (300) to obtain the public password $K_{pub,\ userID}$ (321) and the authentication password $K_{mac,\ userID}$ (520);

m) Derive with the application (310) of the mobile communication device (300) a temporary password $K_{temp,\ pin}$ (340), created on the basis of the temporary security code or pin (301) entered by the user (100) and according to a password derivation algorithm, such as PBKDF2 or PKCS5 protocol;

n) Encrypt the public password $K_{pub,\ userID}$ (321) and the authentication password $K_{mac,\ userID}$ (520) by the application (310) of the mobile communication device (300) from the temporary password $K_{temp,\ pin}$ (340) to generate and store in the memory of the mobile communication device (300) the public password encrypted $K''_{pub,\ userID}$ (320) and the second security password $K''_{mac,\ userID}$ (330);

o) Generate the mobile device identifier, $Id'_{cel,\ userID}$ (414) by the application (310) of the mobile communication device (300) with at least the serial number of the mobile communication device (300) and the password authentication $K_{mac,\ userID}$ (520) and a message authentication code MAC;

p) Generate an activation code (350) concatenating a portion of the public password $K_{pub,\ userID}$ (321) and the identifier of the mobile device $Id'_{cel,\ userID}$ (414); display this activation code (350) on the mobile communication device (300);

q) Enter in the terminal (250) the activation code (350) by the user (100);

r) Send the activation code (350) from the terminal (250) to the remote server (400), identify the portion of the public password portion $K_{pub,\ userID}$ (321) of said activation code (350) and extract and store in the database (410) the identifier of the mobile device $Id'_{cel,\ userID}$ (414); and s) Remove the temporary information related to temporary password $K_{temp,\ pin}$ (340) and the security code or pin (301) of the mobile communication device (300) and remove from the temporary memory of the remote server (400) the public password $K_{pub,\ userID}$ (321) and the authentication password $K_{mac,\ userID}$ (520) and set the user (100) as authorized and enabled for user data (210) in the database (410) of the remote server (400).

The invention claimed is:

1. A method to sign and authenticate secure transactions with an institution through a communications network where a user and a mobile communication device of the user have previously been activated; WHEREIN the method comprises:

a) entering by the user a user data UserID into a terminal located at a site of the institution, the terminal being connected to a communications network, b) sending from the terminal through said communication network, the user data UserID, a request and a request for signing a petition to a remote server, where said remote server comprises: a database storing the user data userID, a private encrypted password $K'_{priv,\ userID}$, a first security password $K'_{mac,\ userID}$ for generating an authentication password $K_{mac,\ userID}$ and an identifier of the mobile communication device $Id'_{cel,\ userID}$;

c) checking in the database of the remote server that for the user data userID, said user is authorized; in case the user is not authorized, then the request is rejected;

d) if the user is authorized, sending, from the remote server, the private encrypted password $K'_{userID}$ and the first security password $K'_{mac,\ userID}$ of said user to a hardware security module to be decrypted;

e) returning from the hardware security module to the remote server a private password $K_{priv,\ userID}$ and the authentication password $K_{mac,\ userID}$ of said user;

f) generating in the remote server a set of signed data $D_s$ using the private password $K_{priv,\ userID}$, wherein said signed data $D_s$ comprises at least the user data userID, the date and time of the request, a signature by the private password $K_{priv,\ userID}$ and the data in the request;

g) generating in the remote server a confirmation code $Cod_{userID,\ Ds}$ by a message authentication code and from the authentication password $K_{mac,\ userID}$, the set of signed data $D_s$, and the identifier of the mobile communication device $Id'_{cel,\ userID}$;

h) sending the confirmation code $Cod_{userID,\ Ds}$ from the remote server to the hardware security module;

i) encrypting said confirmation code $Cod_{userID,\ Ds}$ by the hardware security module to generate a confirmation code encrypted $Cod'_{userID,\ Ds}$, sending the confirmation code encrypted $Cod'_{userID,\ Ds}$ to the remote server and storing the confirmation code encrypted $Cod'_{userID,\ Ds}$ in the database together with the date and time of creation, and setting a number of validation attempts to zero;

j) generating in the remote server a two-dimensional bar code QR from the signed data $D_s$;

k) sending to the terminal the two-dimensional bar code QR and displaying the two-dimensional bar code at the institution's site;

l) starting by said user an application in the mobile communication device, wherein said mobile communication device comprises said application, a security code, a transport password $K_{transporte}$ for decoding activation information, a public password encrypted $K''_{pub,\ userID}$, and a second security password $K''_{mac,\ userID}$ to generate the authentication password $K_{mac,\ userID}$;

m) entering by the user the security code in the application of the mobile communication device;

n) deriving a temporary password $K_{temp,\ pin}$ created on the basis of the security code entered by the user and according to a password derivation algorithm;

o) decrypting by the application of the mobile communication device, the public password encrypted $K''_{pub,\ userID}$ with the temporary password $K_{temp,\ pin}$ and the second security password $K''_{mac,\ userID}$ to obtain a public password $K_{pub,\ userID}$ and the authentication password $K_{mac,\ userID}$;

p) capturing and decoding the two-dimensional bar code QR using the application of the mobile communication device;

q) validating the private password $K_{priv,\ userID}$ of the signed data $D_s$ with the public password $K_{pub,\ userID}$; if validation is false, then the request is rejected;

r) if validation is true, generating, by the application of the mobile communication device, the identifier of the mobile communication device $Id'_{cel,\ userID}$ with at least a serial number of the mobile communication device and the authentication password $K_{mac,\ userID}$ and the message authentication code;

s) generating the confirmation code $Cod_{userID,\ Ds,\ Mobile}$ by said message authentication code and from the authentication password $K_{mac,\ userID}$, the signed data $D_s$, the identifier of the mobile communication device, $Id'_{cel,\ userID}$;

t) displaying the confirmation code $Cod_{userID,\ Ds,\ mobile}$ in the application of the mobile communication device along with data in the request; if the data of the request is incorrect, the user can cancel the operation; if the data is correct the method continues to the next step;

u) entering the confirmation code $Cod_{userID,\ Ds,\ mobile}$ in the terminal;

v) sending from the terminal to the remote server said confirmation code $Cod_{userID, Ds, Mobile}$;

w) encrypting said confirmation code $Cod_{userID, Ds, mobile}$ by the hardware security module as a confirmation code encrypted $Cod'_{userID, Ds, mobile}$;

x) comparing said confirmation code encrypted $Cod'_{userID, Ds, mobile}$ with the confirmation code encrypted $Cod'_{userID, Ds}$ received in step i); if the two codes do not match, the request is rejected;

y) if the confirmation code encrypted $Cod'_{userID, Ds, mobile}$ and the confirmation code encrypted $Cod'_{userID, Ds}$ match and the number of validation attempts does not exceed a predefined maximum within a predefined period of time, sending a success code to the terminal to authorize the request.

2. A method according to claim 1, WHEREIN said two-dimensional bar code QR is a two dimensional code generated by one of a: Quick Response QR Code, PDF417, Data Matrix "Datamatrix", "MaxiCode" and circular bar code "ShotCode".

3. A method according to claim 1, WHEREIN steps d), e), f) and g) are performed in the hardware security module, and the hardware security module includes a processor and internal memory, where the private encrypted password $K'_{priv, userID}$ and the first security password $K'_{mac, userID}$ are stored in said hardware security module.

4. A method according to claim 3, WHEREIN step x) is also performed by the hardware security module, such that the comparison of said confirmation code encrypted $Cod'_{userID, Ds, mobile}$ with the confirmation code encrypted $Cod'_{userID, Ds}$ is performed by said hardware security module.

5. A method according to claim 1, WHEREIN prior to step a) the activation of the mobile communication device of the user is performed by the following steps:

a) accessing the site of the institution through a terminal through a communications network and entering the user data UserID;

b) downloading from the remote server to the mobile communication device, the application and the transport password $K_{transporte}$;

c) sending from the terminal to the remote server the user data UserID and an activation request;

d) checking in the database of the remote server that for the user data UserID, said user is authorized; in case the user is not authorized, then the activation request is rejected;

e) if the user is authorized in d), generating on the remote server the public password $K_{pub, userID}$, the private password $K_{priv, userID}$ and the authentication password $K_{mac, userID}$ that are exclusive for said user data UserID in a temporary memory of said remote server;

f) sending from the remote server, the private password $K_{priv, userID}$ and the authentication password $K_{mac, userID}$ of the user to the hardware security module and removing from the temporary memory of the remote server the private password $K_{priv, userID}$;

g) encrypting in the hardware security module, the private password $K_{priv, userID}$ and the authentication password $K_{mac, userID}$ as the private encrypted password $K'_{userID}$ and the first security password $K'_{mac, userID}$ of the user;

h) returning from the hardware security module to the remote server and storing in the database, the private encrypted password $K'_{priv, userID}$ and the first security password $K'_{mac, userID}$ of the user;

i) encrypting in the remote server the public password $K_{pub, userID}$ and the authentication password $K_{mac, userID}$ by the transport password $K_{transporte}$ and from them generating a two-dimensional bar code activation;

j) capturing and decoding the two-dimensional bar code activation at the site of the institution using the application of the mobile communication device;

k) entering the security code by the user in the application of the mobile communication device;

l) decrypting the information of the two-dimensional bar code activation by the transport password $K_{transporte}$ and the application of the mobile communication device to obtain the public password $K_{pub, userID}$ and the authentication password $K_{mac, userID}$;

m) deriving with the application of the mobile communication device the temporary password $K_{temp, pin}$, created on the basis of the security code entered by the user and according to a password derivation algorithm;

n) encrypting the public password $K_{pub, userID}$ and the authentication password $K_{mac, userID}$ by the application of the mobile communication device using the temporary password $K_{temp, pin}$ to generate and store in memory of the mobile communication device the public password encrypted $K''_{pub, userID}$ and the second security password $K''_{mac, userID}$;

o) generating the mobile device identifier, $Id'_{cel, userID}$ by the application of the mobile communication device with at least the serial number of the mobile communication device and the authentication password $K_{mac, userID}$ and a message authentication code;

p) generating an activation code concatenating a portion of the public password $K_{pub, userID}$ and the identifier of the mobile device $Id'_{cel, userID}$; and displaying the activation code on the mobile communication device;

q) entering in the terminal the activation code by the user;

r) sending the activation code from the terminal to the remote server, identifying the portion of the public password $K_{pub, userID}$ of said activation code and extracting and storing in the database the identifier of the mobile device $Id'_{cel, userID}$; and s) removing temporary information related to the temporary password $K_{temp, pin}$ and the security code from the temporary memory of the remote server and removing from the temporary memory of the remote server the public password $K_{pub, userID}$ and the authentication password $K_{mac, userID}$ and setting the user as authorized and enabled for user data in the database of the remote server.

* * * * *